(12) United States Patent
Molenaar et al.

(10) Patent No.: US 7,458,279 B2
(45) Date of Patent: Dec. 2, 2008

(54) CLAMP-ON MEASURING DEVICE

(75) Inventors: Marcel Meijlom Molenaar, Dordrecht (NL); Jan Teunis Aart Pors, Oud-Beijerland (NL); Jeroen Van Den Berg, Hendrik Ido Ambacht (NL); Cornelis Johannes Hogendoorn, Wijk en Aalburg (NL)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 11/555,505

(22) Filed: Nov. 1, 2006

(65) Prior Publication Data
US 2007/0107533 A1 May 17, 2007

(30) Foreign Application Priority Data
Nov. 2, 2005 (DE) .................... 10 2005 052 550

(51) Int. Cl.
G01N 3/02 (2006.01)
(52) U.S. Cl. ..................................................... 73/856
(58) Field of Classification Search ........... 73/856–860, 73/861.19–861.31
See application file for complete search history.

(56) References Cited

U.S. PATENT DOCUMENTS

| 4,454,767 | A | | 6/1984 | Shinkai et al. |
| 4,735,097 | A | * | 4/1988 | Lynnworth .............. 73/861.28 |
| 4,948,552 | A | | 8/1990 | Mollot et al. |
| 5,131,278 | A | | 7/1992 | Baumoel |
| 5,343,737 | A | * | 9/1994 | Baumoel .................. 73/40.5 R |
| 6,397,683 | B1 | * | 6/2002 | Hagenmeyer et al. .... 73/861.18 |
| 6,532,827 | B1 | | 3/2003 | Ohnishi |
| 6,615,674 | B2 | | 9/2003 | Ohnishi |
| 6,715,366 | B2 | | 4/2004 | Ohnishi |
| 6,883,386 | B2 | | 4/2005 | Osone et al. |
| 2006/0123922 | A1 | | 6/2006 | Froehlich et al. |
| 2007/0251314 | A1 | * | 11/2007 | Molenaar et al. .............. 73/201 |

FOREIGN PATENT DOCUMENTS

DE 10147175 A1 4/2003
EP 0974815 A1 1/2000

* cited by examiner

Primary Examiner—Max Noori
(74) Attorney, Agent, or Firm—David S. Safran

(57) ABSTRACT

A clamp-on measurement device, for attachment to a support, with at least one instrument transformer, a retaining device for holding the instrument transformer and a fastening device (4) for attachment of the retaining means to the support. The retaining device can be attached to the fastening device (4) such that the retaining device can be moved in at least one predetermined direction away from or toward the support and can be pivoted along a pivot axis which runs preferably perpendicular to the predetermined direction. This results in the clamp-on measurement device, after attachment to a support, being easily disengaged from the support for maintenance and repair purposes and then can be reengaged with the support without losing its original alignment.

10 Claims, 3 Drawing Sheets

CLAMP-ON MEASURING DEVICE

BACKGROUND OF THE INVENTION

1. Field of the Invention

The invention relates to a clamp-on measuring device, for attachment to a support, with at least one instrument transformer, a retaining means for holding the instrument transformer and fastening means for attachment of the retaining means to the support.

2. Description of Related Art

A clamp-on measurement device, such as clamp-on flow rate measurement device, is characterized in that they can be used especially easily. In contrast to other flow rate measurement devices which must be permanently integrated into the existing pipeline system by replacing a piece of the pipeline with the device, clamp-on flow rate measurement devices can simply be placed from the outside on a suitable pipe section. The pipe section to which the clamp-on measurement device is attached thus becomes more or less a measurement pipe without the need to insert an independent measurement pipe into the pipeline system. This makes the use of clamp-on flow rate measurement devices simple and economical.

However, the problem with clamp-on measurement devices, such as clamp-on ultrasonic flow rate measurement devices, is the correct attachment of the measurement device to a pipeline, especially with respect to the correct arrangement and alignment of the instrument transformers which, in an ultrasonic flow rate measurement device, are generally formed by two ultrasonic transducers located at a distance from one another in the lengthwise direction of the tube. In addition to the corresponding problem in the initial attachment of the clamp-on ultrasonic flow rate measurement device to the pipe, there is the problem that, even for a correctly positioned and aligned measurement device, this state can be lost again when the instrument transformer must be removed from the pipe, for example, for maintenance purposes. The corresponding problems likewise occur in other clamp-on measurement devices when they are detached from the support on which they are mounted for maintenance and repair purposes and afterwards must be re-attached to the pipe.

SUMMARY OF THE INVENTION

Thus, a primary object of the present invention is to devise a clamp-on measurement device which, after attachment to a support, can be easily detached for maintenance and repair purposes and then can be attached again to the support in the original alignment.

Proceeding from the initially described clamp-on measurement device, this object is achieved in that the retaining means can be attached to the fastening means such that the retaining means can be moved in at least one predetermined direction away from or toward the support and can be pivoted along a pivot axis.

Therefore, in accordance with the invention, it is provided that the retaining means can execute two movements, specifically, one movement away from the support in order to detach the retaining means from the support, and again toward the support in order to reattach the retaining means to the support, and a second movement as pivoting motion along the pivoting axis. Overall, this results in that the side of the retaining means which faces the support and which is, optionally, in direct contact with the support in operation of the clamp-on measurement device, can be made accessible. In this way, repair and maintenance work can be performed from the lower side of the retaining means.

According to one preferred development of the invention, it is also provided here that the retaining means and the fastening means are made and arranged and the instrument transformer is held in retaining means such that, by moving the retaining means away from the support combined with the pivoting motion of the retaining means around the pivot axis, the side of the instrument transformer facing the support beforehand becomes accessible. For a clamp-on ultrasonic flow rate measurement device, in this way, for example, an ultrasonic transducer can be provided with contact fluid in order to ensure good conduction of the ultrasonic signal from the ultrasonic transducer into the pipe and back.

Basically, the pivot axis can be oriented differently, especially the axis can also run parallel to the predetermined direction of motion away from the support. However, according to a preferred development of the invention, it is provided that the pivot axis runs at an angle to the predetermined direction, preferably specifically perpendicular thereto and quite especially preferably also parallel to the lengthwise axis of the retaining means.

The two aforementioned movements of the retaining means can be implemented in various ways. According to a preferred development of the invention, it is provided that the retaining means and the fastening means have means corresponding to one another to ensure the movement of the retaining means away from the support and toward the support and the pivoting motion of the retaining means around the pivot axis.

According to a preferred development of the invention, it is provided especially that there is a groove in the retaining means or the fastening means which runs in the predetermined direction, and there is a projection in the fastening means and the retaining means which engages the groove in order to ensure the movement of the retaining means away from the support and toward the support and the pivoting motion of the retaining means around the pivoting axis. In other words, either in the retaining means or the fastening means, there is a groove in which a projection mounted in the fastening means or the retaining means engages so that by moving the projection in the groove, the direction of motion of the retaining means away from the support and toward the support is defined.

Basically, the retaining means can be attached to the support in different ways. According to a preferred development of the invention, it is provided that the fastening means for attaching the retaining means has at least one fixing means with which the retaining means can be fixed on the support such that the instrument transformer comes into direct contact with the support. According to a preferred development of the invention, these fixing means are, for example, screws or quarter-turn fasteners.

Basically, it is possible to provide holding of the instrument transformer in the retaining means and attachment of the retaining means to the support such that the fastening of the retaining means to the support is linked to holding of the instrument transformer in the retaining means at the same time. According to a preferred development of the invention, it is provided that the holding of the instrument transformer in the retaining means is independent of the fastening of the retaining means to the carrier. In this way, it is specifically possible to remove the retaining means from the support without losing the retention of the instrument transformer, and thus, its alignment. As a result, according to this feature of the invention, holding of the instrument transformer in the retaining means is preserved when the retaining means moves away from the support or toward the support and in the pivoting motion of the retaining means around the pivot axis.

Additionally, the invention can be used for a variety of types of clamp-on measurement devices. According to a preferred development of the invention, however, it is provided that the support is formed by a pipe through which fluid can flow. According to a preferred development of the invention, it is also provided that the clamp-on measurement device is a clamp-on flow rate measurement device, preferably a clamp-on ultrasonic flow rate measurement device.

In clamp-on ultrasonic flow rate measurement devices specifically, the above described advantage is obtained that the retaining means with the ultrasonic converters attached therein can be removed from the measurement tube in a controlled manner and pivoted such that the sides of the ultrasonic transducers otherwise facing the pipe become accessible, so that they can be provided, for example, with a contact fluid. By moving the retaining means back to the pipe, the ultrasonic transducers can, then, be moved back again into direct contact with the pipe so that optimum conduction of the ultrasonic signal from the ultrasonic transducers into the pipe and from it back to the ultrasonic transducers can be guaranteed.

In a clamp-on ultrasonic flow rate measurement device according to a preferred development of the invention, it is finally also to be provided that there are two ultrasonic transducers which are held by the retaining means, which can be moved into direct contact with the pipe and which are located at a distance from one another on an alignment axis which runs parallel to the lengthwise axis of the pipe, and at least one of the ultrasonic transducers can be moved within the retaining means along the alignment axis. This movement capacity of the ultrasonic transducer is preferably made such that the ultrasonic transducer can be detached within the retaining means in order to move it and afterwards can be fixed again so that attained orientation and alignment of the ultrasonic transducers to one another and relative to the pipe are preserved.

In particular, there are now a host of possibilities for embodying and developing the clamp-on measurement device in accordance with the invention. Reference is made to the following detailed description of a preferred embodiment of the invention with reference to the accompanying drawings.

DETAILED DESCRIPTION OF THE INVENTION

Figure 1:
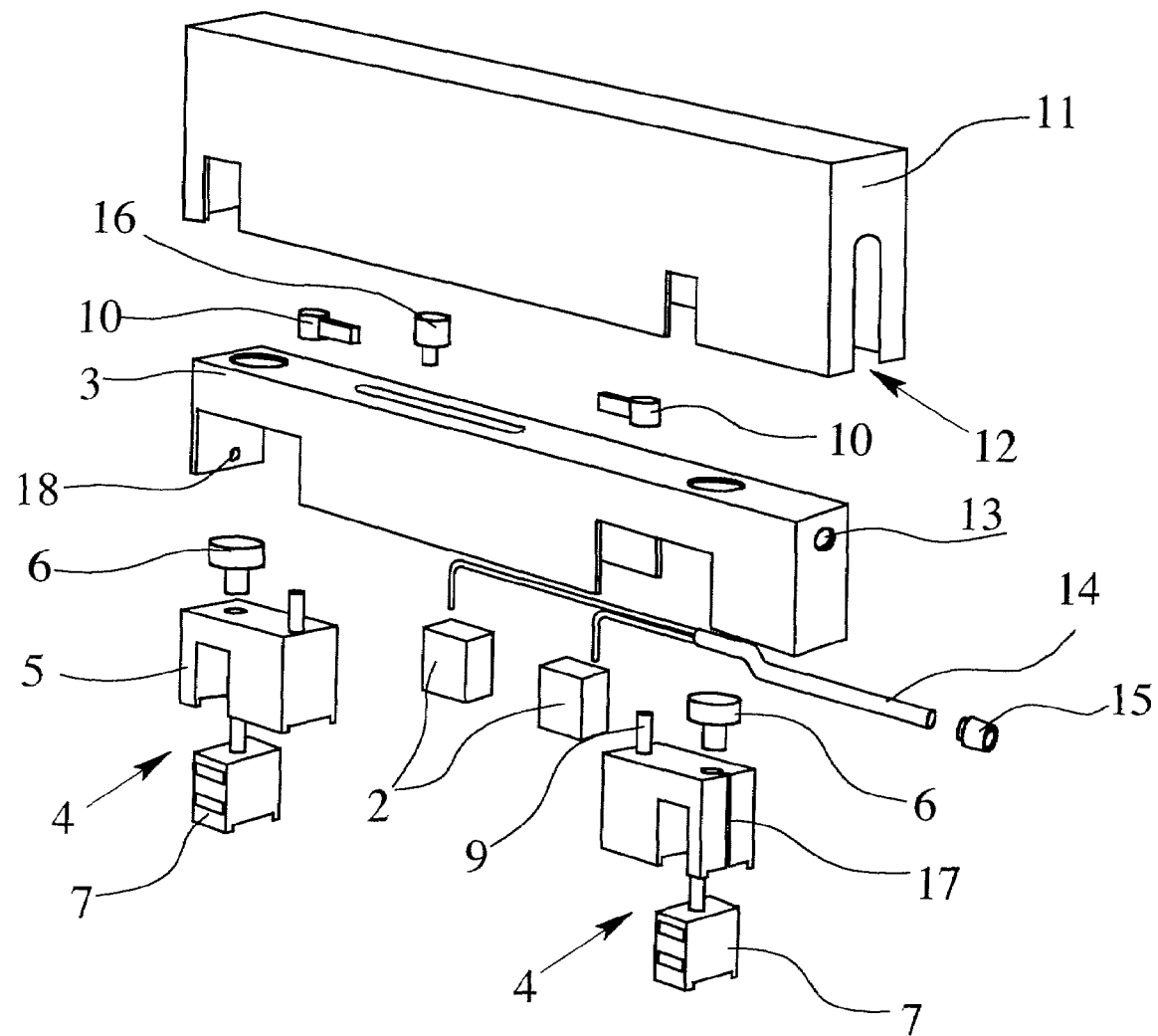
FIG. 1 is an exploded view of a clamp-on measurement device according to a preferred embodiment of the invention, FIGS. 2a-2d schematically show the attachment of the clamp-on measurement device according to the preferred embodiment of the invention, and FIGS. 3a-3e schematically show the detachment of the retaining means of the clamp-on measurement device according to the preferred embodiment of the invention for maintenance purposes.

FIG. 1 shows as a clamp-on measurement device according to a preferred embodiment of the invention that is a clamp-on ultrasonic flow rate measurement device which can be attached to the pipe 1, which pipe is shown in FIGS. 2a-d and 3a-e. The clamp-on ultrasonic flow rate measurement device, as an instrument transformer, has two ultrasonic converters 2, a guide frame 3 which is the retaining means for holding the ultrasonic transducer 2, and two fastening means 4 for attachment of the guide frame 3 to the pipe 1.

The fastening means 4 each have a base body 5 each of which is attached with a knurled nut 6 to the ratchet means 7. As can be taken especially from FIG. 2a, each of the ratchet means 7 is provided with a mounting strap 8 with which it is attached to the pipe 1.

The guide frame 3 is made such that it can be can be attached to the fastening means 4 mounted on the pipe 1. To do this, on the base bodies 5 of the fastening means 4, there is a respective pin 9 which can be routed through a corresponding opening in the top of the guide frame 3. Then, a respective quarter-turn fastener 10 can be placed on the pins 9 projecting through the guide frame 3 so that the guide frame 3 can be fixed on the fastening means 4, as is conventional in quarter-turn fasteners, by means of rotation of the quarter-turn fasteners 10 on the pins 9.

For the clamp-on ultrasonic flow rate measurement device according to the described preferred embodiment of the invention, a housing 11 covers the means which have been installed on the pipe 1. The side surfaces of the housing 11 have a recess 12, and the guide frame 3 has a hole 13 on the corresponding side surface so that an electrical supply lead 14 can be routed through the recess 12 and the hole 13 to the ultrasonic transducers 2 and is secured in the hole 13 by means of a strain relief device 15.

The ultrasonic transducers 2 are held within the guide frame 3 via a clamping retainer. This means that the ultrasonic transducers 2 are attached in the guide frame 3 by their side surfaces sitting in a clamp fit between the long side surfaces of the guide frame 3 so that they cannot be easily moved. However, of the two ultrasonic transducers 2 is provided with an adjustment means 16 with which it can be pushed against the clamping force from the outside of the guide frame 3 in the lengthwise direction thereof when the housing 11 has been detached from the pipe 1. In this way, in the installation of the clamp-on ultrasonic flow rate measurement device according to the preferred embodiment of the invention described here, the optimum position of the ultrasonic transducers 2 relative to one another can be fixed, specifically the position in which, by means of ultrasonic signals which have been reflected on the other side of the pipe 1, optimum transmission from one ultrasonic transducer 2 to the other ultrasonic transducer 2 is ensured.

Figure 2:
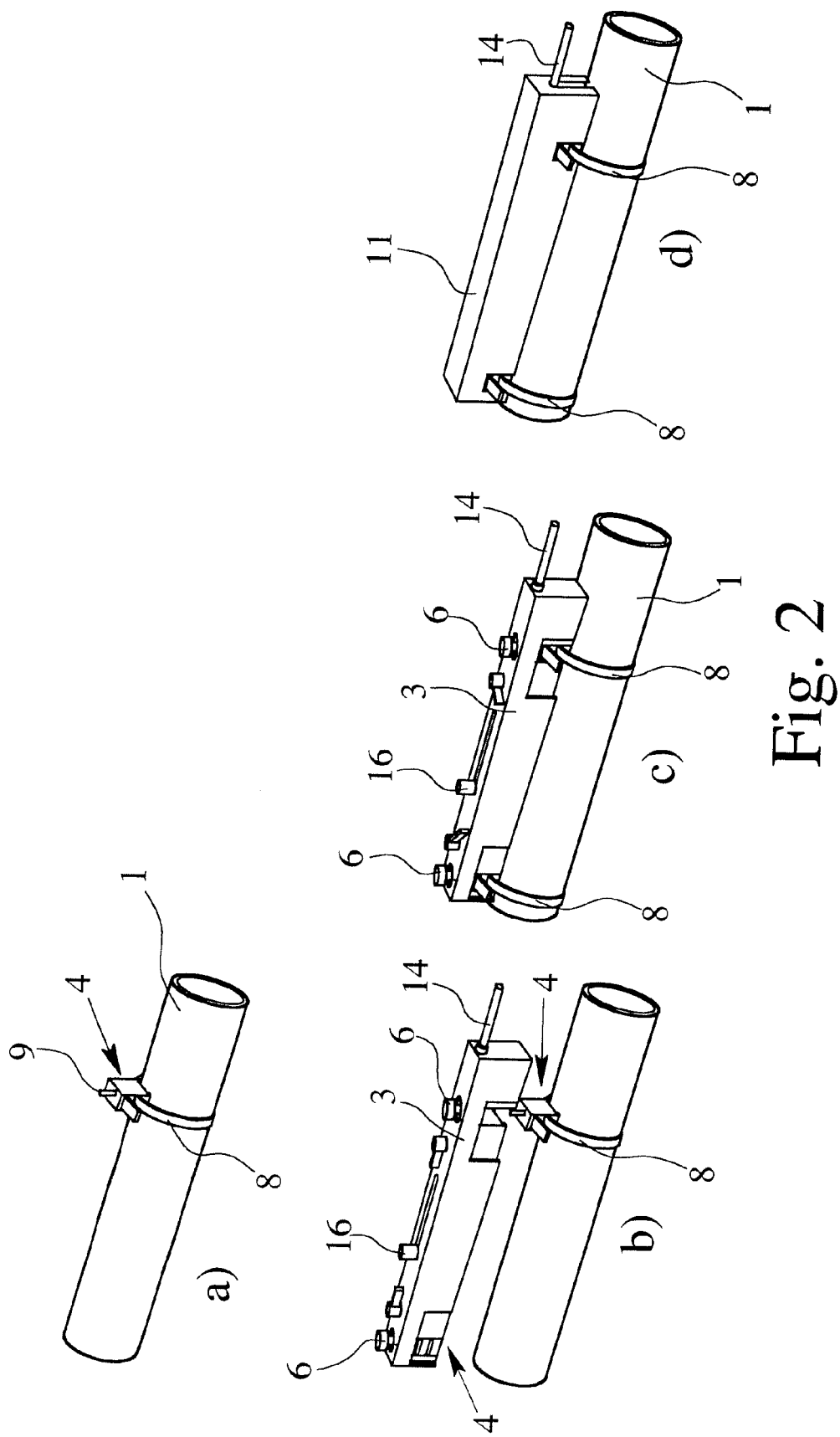
Figure 3:
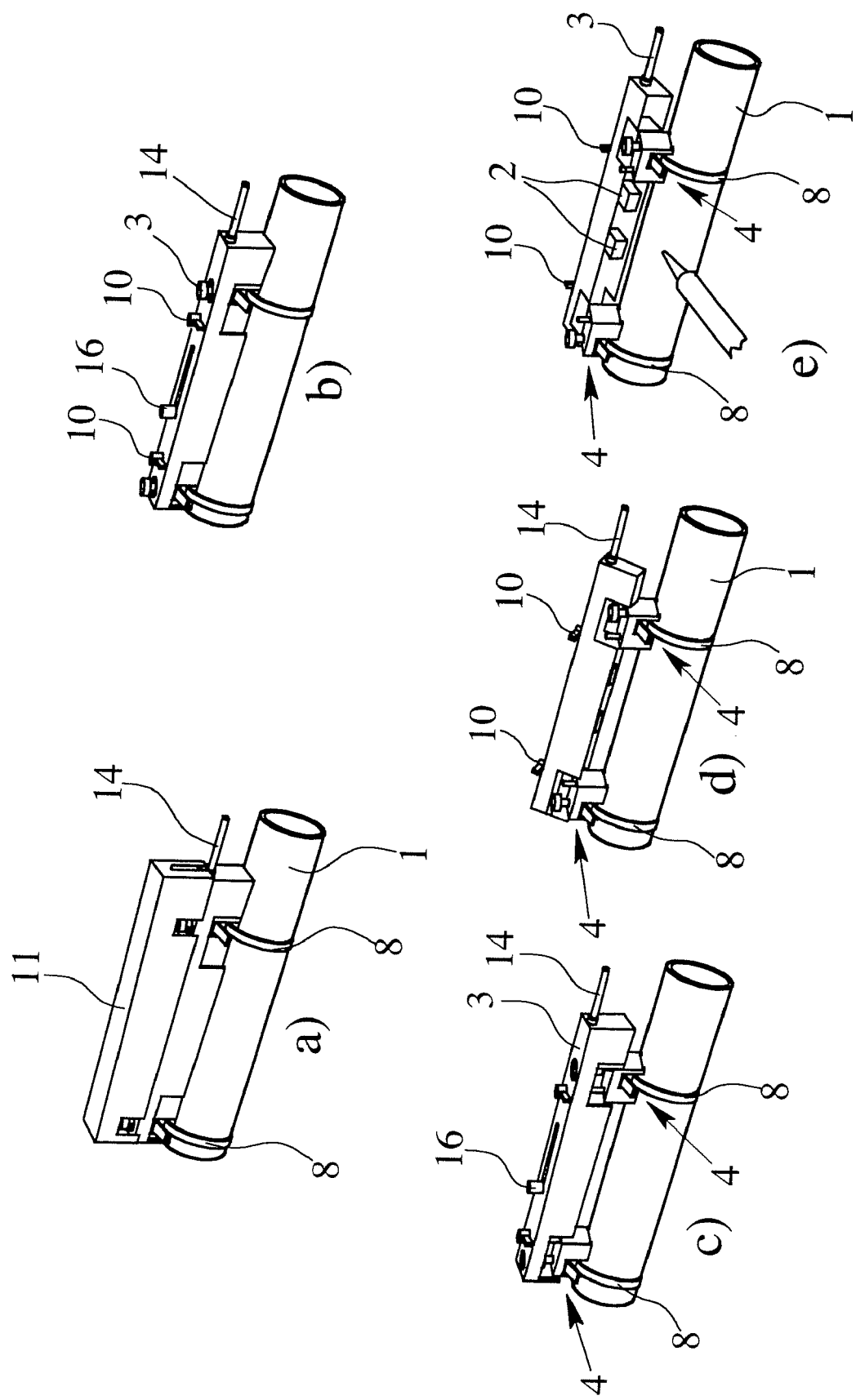

To install the clamp-on ultrasonic flow rate measurement device according to the preferred embodiment of the invention on the pipe 1, the procedure is as follows:

As can be seen in FIG. 2a, first one of the ratchet means 7 is attached to the pipe 1 by one of the mounting straps 8. Then, the guide frame 3 together with the remaining mounting strap 8 and means of the clamp-on ultrasonic flow rate measurement device, other than the housing 11, are placed on the ratchet means 7. By releasing the quarter-turn fasteners 10, the guide frame 3 can be raised off the pipe 1 so that one of the ultrasonic transducers 2 can be pushed by means of the adjustment device 16, as described above, in order to determine the optimum distance of the two ultrasonic transducers 2 from one another. By fixing the quarter-turn fasteners, afterwards, the guide frame 3 is pressed again securely onto the pipe 1 so that the ultrasonic transducers 2 come into direct contact with the pipe 1.

In order to ensure optimum conduction of the ultrasonic signals from the instrument transformers 2 into the pipe 1 and back, a contact fluid is applied beforehand between the pipe 1 and the sides of the ultrasonic transducers 2 that face the pipe 1. To protect the clamp-on ultrasonic flow rate measurement device according to the preferred embodiment, finally, the housing 11 is seated. The clamp-on ultrasonic flow rate measurement device is now ready for operation.

For maintenance purposes, specifically, to renew the contact fluid between the ultrasonic transducers 2 and the outside of the pipe 1, the surfaces of the ultrasonic transducers 2 facing the pipe 1 can be easily made accessible, especially without affected the alignment of the ultrasonic transducers. To do this, as can be taken from FIGS. 3a-e, first the housing 1 is removed from the clamp-on ultrasonic flow rate measurement device. Then, the quarter-turn fasteners 10 are released so that the guide frame 3 can be moved relative to the fastening means 4. Movement of the guide frame 3 away from the pipe 1, combined with the pivoting motion of the guide frame 3 around a pivot axis which runs parallel to the lengthwise axis and perpendicular to the motion of the retaining means 3 away from the pipe 1 is now enabled as follows.

As can be taken from FIG. 1, in the outer side of each of the base bodies 5 of the fastening means 4, there is a respective groove 17 which runs radially outward viewed relative to the pipe 1. In these grooves 17 a respective projection 18 runs; each projection 18 is provided on the inside of the end surfaces of the guide frame 3. In this way, the guide frame 3, on the one hand, can be moved radially away from the pipe 1 or towards it, and on the other hand, based on the round configuration of the projections 18, a pivoting motion of the guide frame 3 is also possible, as can be taken especially form FIGS. 3c & 3d. By raising and then pivoting the guide frame 3, the undersides of the ultrasonic transducers 2 become accessible so that the contact fluid can be renewed in order to be able to ensure stable operation of the clamp-on ultrasonic flow rate measurement device with a good signal-to-noise ratio.

What is claimed is:

1. Clamp-on measurement device, for attachment to a support, comprising:
    at least one instrument transformer,
    a retaining means for holding the instrument transformer, and
    fastening means for attachment of the retaining means to the support,
    wherein the retaining means is attachable to the fastening means in a manner enabling the retaining means to be movable in at least one predetermined direction toward and away from the support and to pivot about a pivot axis,
    wherein the attachment of the retaining means to the fastening means enables an instrument transformer held in the retaining means to be both move away from the support pivoted around the pivot axis in a manner exposing a side of the instrument transformer which had faced the support beforehand, and
    wherein the attachment comprises a groove on one of the retaining means and the fastening means which runs in the predetermined direction and a projection on the other of the fastening means and the retaining means which engages the groove to ensure movement of the retaining means toward and away from the support and the pivoting motion of the retaining means around the pivoting axis.

2. Clamp-on measurement device in accordance with claim 1, wherein the pivot axis extends perpendicular the direction of motion of the retaining means, parallel to the lengthwise axis of the retaining means.

3. Clamp-on measurement device in accordance with claim 1, wherein the support that the fastening means is attachable to is a pipe through which a fluid can flow.

4. Clamp-on measurement device in accordance with claim 1, wherein the fastening means has at least one fixing means for attaching the retaining means on the support such that the instrument transformer comes into direct contact with the support.

5. Clamp-on measurement device in accordance with claim 1, wherein the holding of the instrument transformer in the retaining means is independent of the fastening of the retaining means to a carrier.

6. Clamp-on measurement device in accordance with claim 1, wherein holding of the instrument transformer in the retaining means is preserved when the retaining means moves away from the support or toward the support and in the pivoting motion of the retaining means around the pivoting axis.

7. Clamp-on measurement device in accordance with claim 3, wherein the clamp-on measurement device is a clamp-on flow rate measurement device.

8. Clamp-on measurement device in accordance with claim 7, wherein the clamp-on flow rate measurement device is a clamp-on ultrasonic flow rate measurement device.

9. Clamp-on measurement device in accordance with claim 8, wherein at least one instrument transformer comprises at least on ultrasonic transducer which is movable into direct contact with the pipe.

10. Clamp-on measurement device in accordance with claim 9, wherein the at least one ultrasonic transducer comprises two ultrasonic transducers which are held by the retaining means, are movable into direct contact with the pipe and which are located at a distance from one another on an alignment axis which runs parallel to a lengthwise axis of the pipe, and wherein at least one of the ultrasonic transducers is movable within the retaining means along the alignment axis.

* * * * *